(12) United States Patent
McCormack

(10) Patent No.: US 9,202,065 B2
(45) Date of Patent: Dec. 1, 2015

(54) DETECTING SENSITIVE DATA ACCESS BY REPORTING PRESENCE OF BENIGN PSEUDO VIRUS SIGNATURES

(71) Applicant: International Business Machines Corporation, Armonk, NY (US)

(72) Inventor: Robert John McCormack, Rivervale (AU)

(73) Assignee: GLOBALFOUNDRIES Inc., Grand Cayman (KY)

( * ) Notice: Subject to any disclaimer, the term of this patent is extended or adjusted under 35 U.S.C. 154(b) by 114 days.

(21) Appl. No.: 13/903,610

(22) Filed: May 28, 2013

(65) Prior Publication Data

US 2014/0359772 A1    Dec. 4, 2014

(51) Int. Cl.
G06F 21/60    (2013.01)
G06F 21/56    (2013.01)

(52) U.S. Cl.
CPC .............. *G06F 21/60* (2013.01); *G06F 21/561* (2013.01)

(58) Field of Classification Search
None
See application file for complete search history.

(56) References Cited

U.S. PATENT DOCUMENTS

| 7,284,273 | B1 * | 10/2007 | Szor ................................. 726/24 |
| 8,499,354 | B1 * | 7/2013 | Satish et al. ..................... 726/25 |
| 2012/0150537 | A1 * | 6/2012 | Abe et al. ....................... 704/235 |

FOREIGN PATENT DOCUMENTS

| JP | 2008071177 | | 3/2008 |
| JP | 2008176377 | | 7/2008 |
| JP | 2008176377 A | * | 7/2008 |

* cited by examiner

*Primary Examiner* — Kaveh Abrishamkar
*Assistant Examiner* — Tri Tran

(57) ABSTRACT

An owner of sensitive data is provided with a notification that the sensitive data has been located. To achieve this, the sensitive data is first modified to include one or more data strings that may appear to be suspect but are otherwise benign. These data strings, which are referred to herein as benign pseudo virus signatures (BPVSs), preferably are embedded throughout a piece of sensitive data according to a frequency distribution. When the sensitive data is examined by virus checking software, the benign pseudo virus signatures are detected as potential computer viruses. By using information associated with the signatures, the owner is identified, preferably using the assistance of an intermediary entity that acts as a registry for the BPVSs. Once the owner is identified, a notification is provided to the owner that the sensitive data has been located. Appropriate remedial action can then be taken.

17 Claims, 3 Drawing Sheets

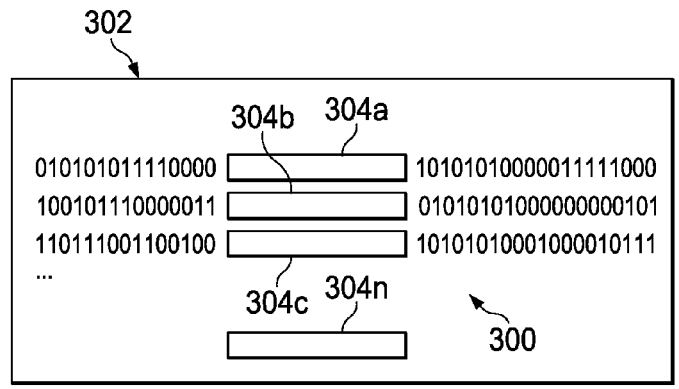
FIG. 3
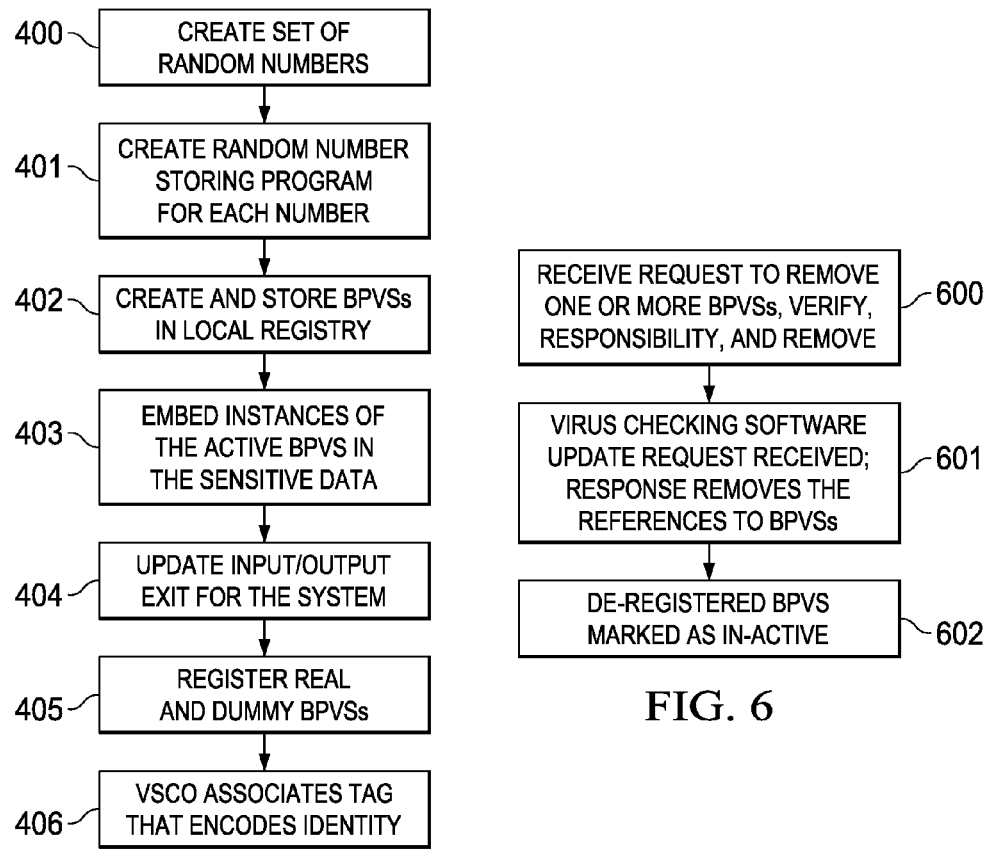
FIG. 4
FIG. 6

DETECTING SENSITIVE DATA ACCESS BY REPORTING PRESENCE OF BENIGN PSEUDO VIRUS SIGNATURES

BACKGROUND OF THE INVENTION

1. Technical Field

This disclosure relates generally to the field of computer technology and, in particular, to techniques to detect when sensitive data may be in danger of being compromised.

2. Background of the Related Art

Business data is growing at exponential rates, and along with that growth is a demand for securing that data. The types of sensitive information that arise in a typical enterprise environment may be quite varied. Such information includes, without limitation, intellectual property (e.g., code, designs, documentation, other proprietary information), identity information (e.g., personally identifiable information (PII)), credit card information (such as PCI-related data), health care information (such as HIPAA-related data), finance information (such as GLBA-related data), and the like. Often, it is desired to maintain some or all of that information as "sensitive" or "confidential"—i.e., known only within the enterprise, or to certain permitted individuals or systems within the enterprise.

Currently, the most effective mechanism to protect data is to provide adequate security measures to control access. Nevertheless, data leakage remains a significant problem. Thus, for example, data leakage from the secured intranet of an enterprise takes place through a variety of means, such as email, instant messaging, file transfers, document printing, removable USB devices, and the like. While data loss prevention systems and other technologies have been developed to address this problem, there remains a need for other techniques that can detect when sensitive data has been acquired (e.g., by a breach of an access control, or some other means).

BRIEF SUMMARY

According to this disclosure, an owner of sensitive data is provided with a notification that the sensitive data has been located. To achieve this, the sensitive data is first modified to include one or more data strings that may appear to be suspect but are otherwise benign. These data strings, which are referred to herein as benign pseudo virus signatures (BPVSs), preferably are embedded throughout a piece of sensitive data according to a frequency distribution. When the sensitive data is examined by virus checking software (in the usual manner), the benign pseudo virus signatures are detected as potential computer viruses. By using information associated with the signatures, the owner is identified, preferably using the assistance of an intermediary entity, such as a virus checking software organization (VCSO) that acts as a registry for the BPVSs. Once the owner is identified, a notification is provided to the owner that the sensitive data has been located. Appropriate remedial action can then be taken.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 illustrates a representative piece of sensitive data that has been modified to include a set of benign pseudo virus signatures according to the disclosure;

FIG. 4 depicts a process flow for creating and registering benign pseudo virus signatures according to this disclosure;

FIG. 6 depicts a process flow for de-registering BPVSs from the virus checking software organization.

DETAILED DESCRIPTION OF AN ILLUSTRATIVE EMBODIMENT

Figure 1:
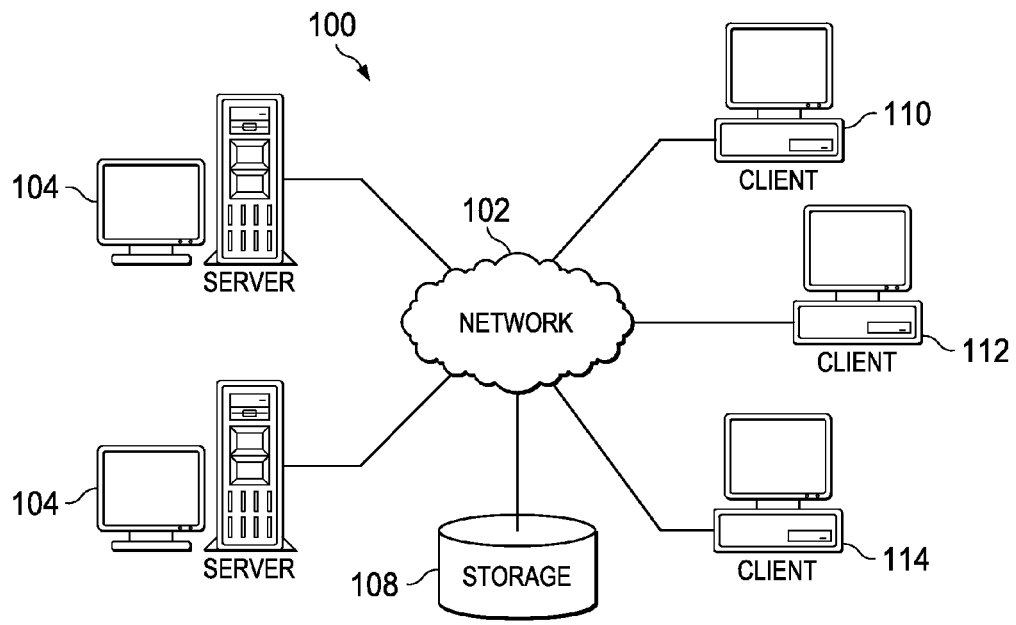
FIG. 1 depicts an exemplary block diagram of a distributed data processing environment in which exemplary aspects of the illustrative embodiments may be implemented.
Figure 2:
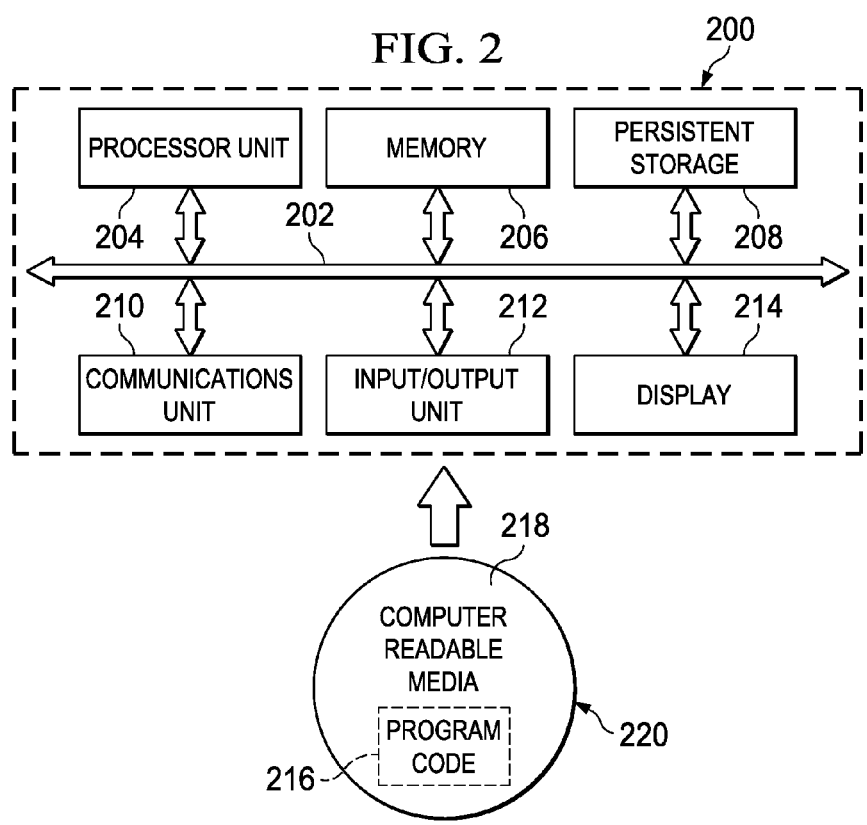
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, Objective-C, C++ or the like, and conventional procedural programming languages, such as the "C" programming language or similar programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Virus Checking

By way of additional background, as computers have become more and more connected via networks, they have become increasingly at risk for contracting computer viruses. A computer virus may be any malicious, unauthorized, or otherwise dangerous computer program or piece of code that "infects" a computer and performs undesirable activities in the computer. Some computer viruses are simply mischievous in nature. But, other viruses can cause a significant amount of harm to a computer and/or its user, including stealing private data, deleting data, clogging the network with many emails or transmissions, and/or causing a complete computer failure. Some viruses even permit a third party to gain control of a user's computer outside of the knowledge of the user, while others may utilize a user's computer in performing malicious activities, such as launching denial-of-service attacks against other computers.

Viruses can take many different forms and can be spread in a wide variety of manners, e.g., as email attachments, macros or scripts, Trojan horses, worms, logic bombs, etc., all of which, for the purposes herein, will be referred to hereinafter as "viruses". Often, a virus will hide in, or "infect," an otherwise healthy computer program, so that the virus will be activated when the infected computer program is executed. Viruses typically also have the ability to replicate and spread to other computer programs, as well as other computers.

To address the risks associated with viruses, significant efforts have been directed toward the development of anti-virus computer programs that attempt to detect and/or remove viruses that attempt to infect a computer. Such efforts have resulted in a continuing competition where virus creators continually attempt to create increasingly sophisticated viruses, and anti-virus developers continually attempt to protect computers from new viruses. One capability of many conventional anti-virus programs is the ability to perform virus checking on virus-susceptible computer files after the files have been received and stored in a computer, e.g., after downloading emails or executable files from the Internet. Server-based anti-virus programs are also typically used to virus check the files accessible by a server. Such anti-virus programs, for example, are often used by web sites for internal purposes, particularly download sites that provide user access to a large number of downloadable executable files that are often relatively susceptible to viruses.

There are several well-accepted methods for detecting computer viruses in memory, programs, documents or other potential hosts that might harbor them. One popular method, employed in many anti-virus products, is called "scanning." A scanner searches (or scans) the potential hosts for a set of one or more (typically several thousand) specific patterns of code called "signatures" that are indicative of particular known viruses or virus families, or that are likely to be included in new viruses. A signature typically consists of a pattern to be matched, along with implicit or explicit auxiliary information about the nature of the match and possibly transformations to be performed upon the input data prior to seeking a match to the pattern. The pattern could be a byte sequence to which an exact or inexact match is to be sought in the potential host. Unfortunately, the scanner must know the signature to detect the virus, and malicious persons are continually developing new viruses with new signatures, of which the scanner may have no knowledge. In an attempt to overcome this problem, other methods of virus detection have been developed that do not rely on prior knowledge specific signatures. These methods include monitoring memory or intercepting various system calls in order to monitor for virus-like behaviors, such as attempts to run programs directly from the Internet without downloading them first, changing program codes, or remaining in memory after execution.

Detecting Sensitive Data Using Embedded Benign Pseudo-Viruses

With the above as background, the following describes the subject matter of this disclosure. According to this disclosure, an owner of sensitive data is provided with a notification that the sensitive data has been located. To achieve this, the sensitive data is first modified to include one or more data strings that may appear to be suspect but are otherwise benign. These data strings, which are referred to herein as benign pseudo virus signatures (BPVSs), preferably are embedded throughout a piece of sensitive data according to a frequency distribution. When the sensitive data is examined by virus checking software (in the usual manner), the benign pseudo virus signatures are detected as potential computer viruses. By using information associated with the signatures, the owner is identified, preferably using the assistance of an intermediary entity, such as a virus checking software organization (VCSO) that acts as a registry for the BPVSs. Once the owner is identified, a notification is provided to the owner that the sensitive data has been located. Appropriate remedial action can then be taken by the owner.

As used herein, the following terms shall have the following meanings:

A "benign pseudo virus signature" (or BPVS) is a string of binary data that is known to virus checking software. Preferably, the BPVS comprises two (2) contiguous components: (i) executable binary code data for a program that, upon execution, stores (in memory) a random number (preferably a large random number), and (ii) the random number itself. As described above, the BPVS is designed to be embedded within "sensitive data" (as defined below). To prevent the BPVS from corrupting the sensitive data that is sought to be protected, preferably all input/output operations that may otherwise act on it have an exit that is aware of the BPVS. As a result, the BPVS is not transferred to the application (or other program or process) that is reading or updating (or otherwise processing) the sensitive data. Further, the BPVS is value that is registered, for example, with a virus checking software organization (or "VCSO") (as defined below). This registration allows the virus checking software organization to know the identity of the "owning entity" (as defined below) that registered the particular BPVS with the virus checking software organization. Preferably, the BPVS registration also provides a point of contact to receive information (e.g., about when and where the BPVS has been detected) should be sent. The point of contact may be a person or program entity. This type of BPVS is sometimes referred to herein as a "real" BPVS.

A "dummy benign pseudo virus signature" (or DBPVS) is a value that, in a preferred embodiment, may also be registered with the virus checking software organization. The entity that registers a DBPVS does not necessarily expect any occurrences (of a BPVS) to be found, but the signature is supplied to hide or otherwise obscure (to the VCSO and virus checking software databases) which BPVSs are valid.

The term "registration" refers to the process by which the entity owning or controlling the sensitive data registers with the VCSO a number of BPVSs (which are real), and optionally a number of DBPVSs (which are not real, or are dummies). Preferably, the registration process is carried out over a secure connection and requires authentication and authorization. During the registration process, the entity represents that it is the legal owner of the sensitive data (which itself is not exposed), and the point of contact to receive information when the VCSO (e.g., through execution of virus checking software) has been informed of detected BPVSs.

The term "sensitive data" refers to the data that an "owning entity" (as defined below) considers important to its operations and for which access controls are typically required. Representative examples of course are context-dependent and include, without limitation, customer details, bank account holders, insurance history, medical data, and so forth. Such data typically also is confidential. The particular type, nature and format of the sensitive data are not an aspect of this disclosure. It is assumed, however, that any and all instances of particular sensitive data be known to the applicable security systems and that the owning entity be notified in the event of some access to the sensitive data so that a determination can be made regarding whether that access was expected and appropriate or, rather, represents a compromise or potential compromise of the sensitive data.

The term "owning entity" is an entity (e.g., commercial, educational, private, governmental, or the like) that owns or controls the sensitive data. The term "owning" should be broadly construed to refer also to management or control over the sensitive data.

A "virus checking software organization" (the VCSO) is an entity that provides virus checking software, or virus checking software-as-a-service (SaaS). Typically, and as described above, a VCSO also provides a service by which owning entities register BPVSs. The VCSO, upon receiving an indication that a BPVS has been detected (e.g., in a scan of the sensitive data by a virus checker), reports those occurrences to the owning entity. In particular, the VCSO would be expected to report occurrences of BPVSs on the owning entity's own computer systems in a straightforward manner (by providing an agreed-upon notification); in contrast, the VCSO would be expected to report occurrences of BPVSs on non-owning entity computer systems in a manner that complies with any relevant local rules, laws or other legal requirements.

A "frequency distribution" refers to distributing (preferably uniformly) a set of preferably identical BPVSs throughout the sensitive data. The frequency distribution of BPVSs may be static, dynamic, or configurable. By distributing BPVSs in the sensitive data, it is then possible to determine what percentage of the sensitive data has been encountered, preferably by determining the number of BPVSs found. For example, if a file of sensitive data originally contained a frequency distribution containing nine (9) BPVSs and a scan of another file encountered two (2) of the same BPVSs, then it may be assumed that the scanned file contains between 20-40% of the original file.

A "registered owner" is an entity that purchases or otherwise has rights in virus checking software (sometimes referred to as "anti-virus" software, or a "virus checker"). Typically, it is a name that is held within the virus checking software for comparison purposes to determine whether the registered owner is also the owning entity.

An "input/output exit" is some sanctioned interruption of an input or output process within an operating system. In a representative operating system, e.g., IBM® z/OS operating system executing in an IBM z196 computer, an input/output exit is an action carried out in response to an approved or registered supervisor calls (SVCs). The z/OS operating system is sensitive to the presence of these registered SVCs during its operation and invokes them during specific functions it is running. An exit may perform processes before the input/output process starts, during the input/output process, or upon the conclusion of the input/output process. The description of an input/output exit in the context of the above-identified operating system is merely exemplary; other operating systems have similar operations referred to by different nomenclature.

FIG. 3 illustrates how a piece of sensitive data may be modified or "seeded" with benign pseudo virus signatures (BPVSs) for the purpose of enabling virus checking software to identify their presence and thus indicate the possible compromise of the sensitive data. In this example, the sensitive data 300 is stored in a data store 302, such as computer memory, disk storage, or the like. The sensitive data 300 is seeded throughout with a set of benign pseudo virus signatures 304a-n embedded in the sensitive data. It is assumed that a benign pseudo virus signature (BPVS) has been registered, preferably with a virus software checking organization (VSCO), as has been described. As will be described, typically the BPVSs are embedded in uniformly-spaced locations throughout the sensitive data, with the number of locations determined according to a frequency distribution. The particular number of BPVSs 304 within a particular piece of sensitive data, as well as the locations for those signatures, may be varied.

FIG. 4 is a process flow illustrating how to create and register a benign pseudo virus signature (BPVS) according to an embodiment of this disclosure. The routine begins at step 400 by creating a set of random numbers. Preferably, a random number has a length greater than a given value (e.g., 100 bytes). As the length of the random number increases, the number is more easily identifiable by virus scanning software. Although random numbers are preferred, pseudo-random numbers may also be used. At step 401, and for each random number, a random number storing program is created. The program preferably is small in size, and its basic purpose is to store the associated random number in a computer memory (or other data store). Preferably, and as noted above, the program (in binary form), together with the random number, is the BPVS. Stated another way, the BPVS comprises: program code data (for storing a random number) concatenated with the random number. At step 402, the BPVSs (for the set of random numbers) are then stored, e.g., in a local registry. At this step, at least one of the BPVSs is marked as the "real" BPVS and the others are marked as "dummy" BPVSs. In addition, each real BPVS is associated with a name or other identifier of a piece of sensitive data into which the real BPVS is to be embedded. A registry entry for a real BPVS is then marked as active.

The routine then continues at step 403 to embed copies of the active BPVS into the piece of sensitive data according to the frequency distribution. The result is illustrated in FIG. 3. As described above, the frequency distribution may call for the BPVS to be embedded in and at one or more locations throughout the sensitive data. Typically, there will be a trade-off between the number of instances of a BPVS embedded in the sensitive data and that size of that data. If the sensitive data is large, then there may be additional instances of the BPVS. If the sensitive data is small, only a small number (or even just one) BPVS may be embedded. In an alternative embodiment, the BPVSs are embedded in random or pseudo-random locations within the sensitive data. In still another embodiment, different BPVSs are embedded in the sensitive data. Preferably, the embedding process is performed by a utility that, during the embedding process, also operates to bypass any input/output exits that may be in operation.

The routine then continues at step 404. At this step, any applicable input/output exit for the computer system (that is authorized to process the sensitive data) is updated so that when each input/output exit occurs, any read, write or update of the sensitive data is carried out in such a manner that existence of the BPVS (or BPVSs) that have been embedded in the sensitive data do not affect the input/output exit processing. In one embodiment, this result is achieved as follows. During a read of the sensitive data, preferably the program requesting the read is not made aware of the presence of the BPVS. One method to accomplish this is for the input/output exit operation to read the local register and check if the file that is being processed is registered; if so, then the exit can acquire a copy of the BPVS and is made aware of what data (namely, the BPVS) that should not be passed through to the program requesting the read. During a write or an update of the sensitive data, the BPVS or BPVSs embedded therein remain untouched by the operation. In particular, during an update operation, the input/output exit causes the associated read to bypass the BPVS in the manner described; during the write operation, the input/output exit ensures the BPVS is not overwritten. When data is written to a new file deemed sensitive, it is assumed that system administrator (or some other permitted person) has previously built this file as described.

The routine then continues at step 405, during which the real and dummy PBVSs are registered with the virus checking software organization (VCSO). At this step, the registering entity typically will inform the VCSO that it is the owning entity on any data that is found with these BPVSs present. The owning entity may also supply point of contact details for any notification(s). At step 406, the VCSO associates a tag with the real and dummy BPVSs that have been registered. The tag may encrypt given information, such as the name of the owning entity, the point of contact, and the like. This completes the process of creating and registering the BPVSs.

Figure 5:
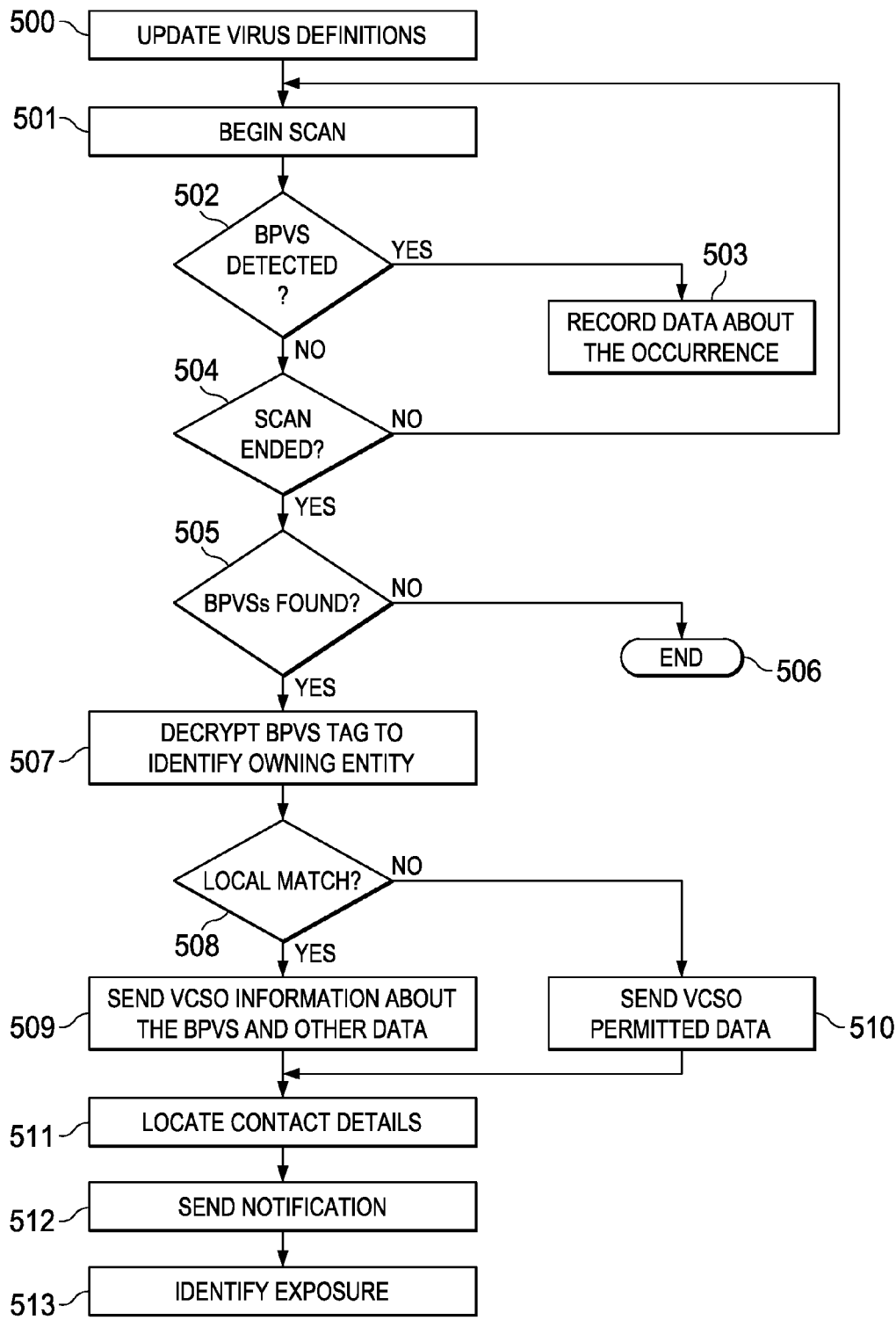
FIG. 5 depicts a process flow for processing BPVSs by virus checking software according to this disclosure.

Referring now to FIG. 5, a process flow describing operations on an individual computer system having virus checking software is depicted. This virus checking software may be provided as a stand-alone product (e.g., Norton® AntiVirus, IBM SONAS, and many others) or even as cloud-based service. As is well-known, virus checking software (sometimes referred to as "anti-virus") is software used to prevent, detect and remove malware, such as computer viruses, rootkits, Trojan horses, worms, adware, spyware, and the like. An anti-virus software tool typically uses signature-based detection, which involves searching for known patterns of data within code or other data strings. Other detection approaches are based on heuristics. The particular type of anti-virus software is not a limitation of this disclosure. Typically, the anti-virus software executes in a data processing system such as described and illustrated above.

At step 500, the virus checking software updates its database of virus definitions, typically by interacting with the VCSO over a secure or otherwise private network connection. During this update, which may occur periodically, BPVSs (and their associated tags) are added to the database associated with the virus checker. At step 501, a scan is initiated by the virus checking software. A test is performed at step 502 to determine whether a BPVS has been detected. If so, the routine branches to step 503 and records data about this occurrence. The information may be varied but typically includes name and IP address (or other location) of the computer system, the name of the file in which the BPVS was found, the domain, log-in details about the user, and the like. If, however, the outcome of the test at step 502 is negative, the routine continues at step 504 to test whether the scan has ended. If not, the routine returns to step 501. If the scan has ended, control branches to step 505 to test whether any BPVSs have been found. If not, the routine ends at step 506. If, however, BPVSs have been found, control branches to step 507. At step 507, the virus checking software decrypts the BPVS tag to identify the BPVS owning entity. The routine then continues at step 508 to determine if there is a match between the BPVS owning entity so determined and the registered owner of the virus checking software. If the outcome of the test at step 508 determines that there is a match (i.e., the registered owner of the virus checking software matches the owning entity associated with the BPVS that the virus checking software has found), the routine continues at step 509. At step 509, the virus checking software sends the VCSO information about the BPVS and other permitted information collected at step 503 (e.g., the asset where the BPVS is located, the user information for the computer system, and the like). If, however, the outcome of the test at step 508 determines that there is no match (i.e., the registered owner of the virus checking software does not match the owning entity associated with the BPVS that the virus checking software has found), control continues at step 510. At step 510, the virus checking software only sends the VCSO information about the BPVS (and perhaps other information) where it is legally permitted to do (based on local practice, regulation, or law).

Regardless of which path (509 or 510), control then continues at step 511. At this step, and for each discovered BPVS, the contact details for the owning entity are located. At step 512, information concerning the discovered BPVSs owned by a specific owning entity is sent to that entity. The routine then continues at step 513. At this step, a security administrator at the owning entity checks the received information to determine whether a security exposure has been uncovered. If so, the owning entity can take an appropriate remedial or other action. The particular action depends on the nature of the compromise of the sensitive data.

FIG. 6 illustrates a process flow for de-registration of a BPVS from a VCSO. The operations illustrated occur with the virus checking software database. The routine begins at step 600 upon issuance of a request to the VCSO to remove one or more BPVSs. Upon receipt, the VCSO verifies its responsibility for the BPVS (e.g., using the tag), and then removes the BPVS and its tag from the organization's virus database. The BPVS is then de-registered. At step 601, the virus checking software issues a request for an update to its internal database. This request is processed in the usual manner by the VCSO, but the update response then removes the local reference to the BPVS that was de-registered at step 600. At step 602, the de-registered BPVS is now marked as inactive in the local registry. This completes the processing.

The disclosed technique provides several advantages. The technique enables an owning entity to be notified when an instance of its sensitive data (sought to be protected) has been found in a given location, a given computer system, or the like. Once the owning entity has been so notified, it can then take any necessary remedial or other actions. The technique for notifying the owning entity of the sensitive data instance takes advantage of known virus checking software and methods, but does so in a unique manner. As has been described, the sensitive data to be protected is first seeded with benign pseudo virus signatures that have first been "registered" with an appropriate virus checking software organization. That organization may be one that also provides virus checking software. When virus checking software analyzes given systems, computer systems, files or the like, it may encounter a registered BPVS. Using information associated with that BPVS, the owning entity can be notified of the detection of the sensitive data. The approach thus cleverly leverages the virus checking infrastructure and provides an additional way to identify potential compromise of the sensitive data.

The functionality described above may be implemented as a standalone approach, e.g., a software-based function executed by a processor, or it may be available as a managed service (including as a web service via a SOAP/XML interface). Typically, the approach may be implemented in association with a virus checking software program. The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the BPVS generation, registration and analysis functions are each implemented in software, which includes but is not limited to firmware, resident software, microcode, and the like. The BPVSs may be stored or otherwise configured into a data structure (e.g., an array, a linked list, etc.) and stored in a data store, such as computer memory. Furthermore, as noted above, the functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the BPVS creation, registration, analysis and related notification components are implemented in a special purpose computer, preferably in software executed by one or more processors. The software also is maintained in one or more data stores or memories associated with the one or more processors, and the software may be implemented as one or more computer programs.

One or more of the above-described functions may be implemented as an adjunct or extension to an existing access manager or security policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described my invention, what I now claim is as follows:

1. A method to detect that sensitive data has been located, comprising:
   embedding in the sensitive data one or more instances of a benign pseudo virus signature whose presence in the sensitive data does not impair a permitted use of the sensitive data;
   registering the benign pseudo virus signature; and
   receiving a notification that one or more instances of the benign pseudo virus signature have been detected in the sensitive data, wherein the notification indicates detection of the sensitive data and includes identifying information, the notification occurring as a result of a scan having been performed on the sensitive data that results in detection of a registered benign pseudo virus signature;
   the identifying information including an indication of a percentage of the sensitive data detected as being original, as determined by a number of instances of the benign pseudo virus signature detected in the scan;
   wherein at least one of the embedding, registering and receiving operations are carried out in software executing in a hardware element.

2. The method as described in claim 1 wherein the one or more instances of the benign pseudo virus signatures are embedded in the sensitive data at uniform locations within the sensitive data according to a frequency distribution.

3. The method as described in claim 1 wherein the benign pseudo virus signature comprises program code, and a string value generated by execution of the program code.

4. The method as described in claim 3 wherein the string value is a random number, and the program code is executable by an application authorized to process the sensitive data to store the string value, the application having input and output exits unaffected by the one or more instances of the benign pseudo virus signature.

5. The method as described in claim 1 wherein the identifying information includes one of: a location of a computer system at which the scan is performed, and data associated with a computer system upon which the sensitive data was located.

6. The method as described in claim 1 further including registering at least one dummy benign pseudo virus signature to mask which ones of a set of signatures represent real benign pseudo virus signatures.

7. Apparatus, comprising:
   a processor;
   computer memory holding computer program instructions that when executed by the processor perform a method to detect that sensitive data has been located, the method comprising:
   embedding in the sensitive data one or more instances of a benign pseudo virus signature whose presence in the sensitive data does not impair a permitted use of the sensitive data;
   registering the benign pseudo virus signature; and
   receiving a notification that one or more instances of the benign pseudo virus signature have been detected in the sensitive data, wherein the notification indicates detection of the sensitive data and includes identifying information, the notification occurring as a result of a scan having been performed on the sensitive data that results in detection of a registered benign pseudo virus signature;
   the identifying information including an indication of a percentage of the sensitive data detected as being original, as determined by a number of instances of the benign pseudo virus signature detected in the scan.

8. The apparatus as described in claim 7 wherein the one or more instances of the benign pseudo virus signatures are embedded in the sensitive data at uniform locations within the sensitive data according to a frequency distribution.

9. The apparatus as described in claim 7 wherein the benign pseudo virus signature comprises program code, and a string value generated by execution of the program code.

10. The apparatus as described in claim 9 wherein the string value is a random number, and the program code is executable by an application authorized to process the sensitive data to store the string value, the application having input and output exits unaffected by the one or more instances of the benign pseudo virus signature.

11. The apparatus as described in claim 7 wherein the identifying information includes one of: a location of a computer system at which the scan is performed, and data associated with a computer system upon which the sensitive data was located.

12. The apparatus as described in claim 7 wherein the method further includes registering at least one dummy benign pseudo virus signature to mask which ones of a set of signatures represent real benign pseudo virus signatures.

13. A computer program product in a non-transitory computer readable medium for use in a data processing system, the computer program product holding computer program instructions which, when executed by the data processing system, perform a method to detect that sensitive data has been located, the method comprising:
   embedding in the sensitive data one or more instances of a benign pseudo virus signature whose presence in the sensitive data does not impair a permitted use of the sensitive data;
   registering the benign pseudo virus signature; and
   receiving a notification that one or more instances of the benign pseudo virus signature have been detected in the sensitive data, wherein the notification indicates detection of the sensitive data and includes identifying information, the notification occurring as a result of a scan having been performed on the sensitive data that results in detection of a registered benign pseudo virus signature;
   the identifying information including an indication of a percentage of the sensitive data detected as being original, as determined by a number of instances of the benign pseudo virus signature detected in the scan.

14. The computer program product as described in claim 13 wherein the one or more instances of the benign pseudo virus signatures are embedded in the sensitive data at uniform locations within the sensitive data according to a frequency distribution.

15. The computer program product as described in claim 13 wherein the benign pseudo virus signature comprises program code, and a string value generated by execution of the program code.

16. The computer program product as described in claim 15 wherein the string value is a random number, and the program code is executable by an application authorized to process the sensitive data to store the string value, the application having input and output exits unaffected by the one or more instances of the benign pseudo virus signature.

17. The computer program product as described in claim 13 wherein the identifying information includes one of: a location of a computer system at which the scan is performed, and data associated with a computer system upon which the sensitive data was located.

* * * * *